(12) United States Patent
Potash et al.

(10) Patent No.: US 10,079,401 B2
(45) Date of Patent: Sep. 18, 2018

(54) SYMMETRIC REDOX FLOW BATTERY CONTAINING ORGANIC REDOX ACTIVE MOLECULE

(71) Applicant: CORNELL UNIVERSITY, Ithaca, NY (US)

(72) Inventors: Rebecca Potash, Duxbury, MA (US); James R. McKone, Ithaca, NY (US); Hector D. Abruna, Ithaca, NY (US); Sean Conte, Ithaca, NY (US)

(73) Assignee: CORNELL UNIVERSITY, Ithaca, NY (US)

( * ) Notice: Subject to any disclaimer, the term of this patent is extended or adjusted under 35 U.S.C. 154(b) by 30 days.

(21) Appl. No.: 15/128,550

(22) PCT Filed: Mar. 23, 2015

(86) PCT No.: PCT/US2015/021963
§ 371 (c)(1),
(2) Date: Sep. 23, 2016

(87) PCT Pub. No.: WO2015/148357
PCT Pub. Date: Oct. 1, 2015

(65) Prior Publication Data
US 2017/0187059 A1    Jun. 29, 2017

Related U.S. Application Data (60) Provisional application No. 61/969,550, filed on Mar. 24, 2014, provisional application No. 62/019,690, filed on Jul. 1, 2014.

(51) Int. Cl.
*H02J 7/00* (2006.01)
*H01M 8/00* (2016.01)
(Continued)

(52) U.S. Cl.
CPC ....... *H01M 8/188* (2013.01); *H01M 8/04276* (2013.01); *H02J 7/0052* (2013.01);
(Continued)

(58) Field of Classification Search
CPC ...... H02J 7/0052; H02J 7/0063; H01M 8/188; H01M 8/04276; H01M 2250/10; H01M 2300/002; H01M 2300/0025
(Continued)

(56) References Cited

U.S. PATENT DOCUMENTS

| | | | | |
|---|---|---|---|---|
| 4,315,973 A | * | 2/1982 | Manassen | C25B 1/003 204/278.5 |
| 4,469,760 A | * | 9/1984 | Giner | H01M 8/184 429/105 |

(Continued)

FOREIGN PATENT DOCUMENTS

WO    WO 2011/131959 A1    10/2011

OTHER PUBLICATIONS

International Search Report dated Jul. 2, 2015 issued in PCT/US2015/021963.
(Continued)

*Primary Examiner* — Phallaka Kik
(74) *Attorney, Agent, or Firm* — Scully Scott Murphy & Presser (57) ABSTRACT

A redox flow battery comprising: a positive compartment containing a positive electrode in contact with a liquid electrolyte comprised of an organic redox active molecule dissolved in a solvent; a negative compartment containing a negative electrode in contact with a liquid electrolyte comprised of said organic redox active molecule dissolved in a solvent; electrical communication means for establishing electrical communication between said positive electrode, said negative electrode and an external load for directing
(Continued)

electrical energy into or out of said symmetric redox flow battery; a separator component that separates the electrolyte solutions in the positive and negative compartments while permitting the passage of non-redox-active species between electrolyte solutions in positive and negative compartments; and means capable of establishing flow of the electrolyte solutions past said positive and negative electrodes, respectively. Methods of using the above-described redox flow battery for storing and releasing electrical energy are also described.

34 Claims, 6 Drawing Sheets (51) Int. Cl.
    *H01M 8/18*     (2006.01)
    *H01M 8/04276*     (2016.01)

(52) U.S. Cl.
    CPC ....... *H02J 7/0063* (2013.01); *H01M 2250/10* (2013.01); *H01M 2300/002* (2013.01); *H01M 2300/0025* (2013.01)

(58) Field of Classification Search
    USPC .......................................... 320/128, 107, 167
    See application file for complete search history.

(56) References Cited

U.S. PATENT DOCUMENTS

| | | | |
|---|---|---|---|
| 5,817,842 | A | 10/1998 | Clerici et al. |
| 8,753,761 | B2 | 6/2014 | Esswein et al. |
| 2003/0068561 | A1 | 4/2003 | Okahara et al. |
| 2004/0234843 | A1 | 11/2004 | Skyllas-Kazacos |
| 2005/0244707 | A1 | 11/2005 | Skyllas-Kazacos et al. |
| 2008/0081247 | A1 | 4/2008 | Nakaishi et al. |
| 2009/0023804 | A1 | 1/2009 | Baugh et al. |
| 2010/0047671 | A1 | 2/2010 | Chiang et al. |
| 2011/0045332 | A1 | 2/2011 | Horne et al. |
| 2011/0195283 | A1 | 8/2011 | Sun et al. |
| 2011/0274948 | A1* | 11/2011 | Duduta ............... B60L 11/1879 429/50 |
| 2012/0028137 | A1 | 2/2012 | Chase et al. |
| 2012/0135278 | A1 | 5/2012 | Yoshie et al. |
| 2012/0164499 | A1* | 6/2012 | Chiang ................. H01M 8/188 429/81 |
| 2013/0022846 | A1* | 1/2013 | Liu ....................... H01M 8/188 429/81 |
| 2013/0157162 | A1 | 6/2013 | Dong et al. |
| 2013/0224550 | A1 | 8/2013 | Bugga et al. |
| 2013/0266836 | A1 | 10/2013 | Wang et al. |
| 2014/0050947 | A1* | 2/2014 | Donnelly ............... H01G 11/04 429/7 |
| 2014/0370403 | A1 | 12/2014 | Narayan et al. |
| 2016/0190628 | A1* | 6/2016 | Young ................... H01M 8/188 429/51 |
| 2016/0351969 | A1* | 12/2016 | Maschmeyer ........ H01M 4/388 |

OTHER PUBLICATIONS

Yan, N. F. et al., "Solar rechargeable redox flow battery based on Li2WO4/LiI couples in dual-phase electrolytes", J. Mater. Chem. A, (2013), vol. 1, 4 pages.

International Search Report dated Jun. 20, 2015 issued in PCT/US2015/021964.

Duan et al. "A symmetric organic-based nonaqueous redox flow battery and its state of charge diagnostics by FTIR" Journal of Materials Chemistry A, 2016, 4, pp. 5448-5456, Mar. 10, 2016.

* cited by examiner

Disperse Blue 1

Disperse Blue 14

Disperse Blue 134

Disperse Green 3

SYMMETRIC REDOX FLOW BATTERY CONTAINING ORGANIC REDOX ACTIVE MOLECULE

CROSS-REFERENCE TO RELATED APPLICATIONS

This application claims priority from U.S. Provisional Application No. 61/969,550, filed Mar. 24, 2014, and U.S. Provisional Application No. 62/019,690, filed Jul. 1, 2014, both of which are herein incorporated by reference in their entirety.

STATEMENT REGARDING FEDERALLY SPONSORED RESEARCH

This invention was made with government support under Contract Nos. DE-SC0001086 and DE-AC05-06OR23100 awarded by the Department of Energy, and Contract No. DGE-0903653 awarded by the National Science Foundation. The government has certain rights in the invention.

BACKGROUND OF THE DISCLOSURE

Current renewable energy sources, such as wind and solar, only provide energy intermittently and generally do not coincide with peak load times. Thus, large scale energy storage would be important for more efficiently utilizing renewable energy sources and integrating them into the grid. A proposed solution for energy management is to develop smaller, smarter grids with localized energy storage capabilities, so that any excess energy generated may be stored and then reintroduced to the grid during peak load times. A particular technology capable of storing large amounts of electrical energy is the redox flow battery (RFB). This type of battery, also called a semi-fuel cell, uses liquid solutions of redox-active chemicals as energy storage media, rather than the solid-state electrode materials found in conventional batteries. In an RFB, energy invested by means of an external supply of electric current and voltage is converted into electrochemical potential energy by directing opposite redox reactions in the anolyte and catholyte. The stored electrochemical energy can be converted into electrical energy upon discharge with concomitant reversal of the opposite redox reactions.

While most batteries contain solid electrodes, RFBs are powered by electroactive species dissolved in liquid electrolyte solutions, i.e., a catholyte and an anolyte, which are stored in large tanks and flowed through parallel plates between current collectors and an ion selective membrane. The modular design of RFBs allows for the independent control of power and energy density by controlling such parameters as flow rate, catholyte/anolyte concentration, electrode surface area, and storage tank size.

The RFB was initially developed by Thaller, et al. working for the U.S. National Aeronautics and Space Administration (U.S. Pat. No. 3,996,064). The Thaller RFB system was based on $Fe^{3+/2+}$ and $Cr^{3-/2-}$ redox couples in acidic solution. More recently, there has been great interest in the development of all-vanadium RFB systems, which use four different redox states of vanadium to facilitate two redox reactions in the battery full cell (e.g., Skyllas-Kazacos, M., et al., *J. Electrochem. Soc.,* 1987, 134, pp. 2950-2953; and Skyllas-Kazacos, M., et al., *J. Electrochem. Soc.,* 2011, 158, R55). Notably, the same chemical parent species (vanadium) is used for both of the requisite redox reactions, i.e., vanadium ions in both the catholyte (V IV/V) and the anolyte (V III/II), which minimizes the effects of membrane crossover. However, the vanadium RFB suffers from a low cell voltage (1.26 V, compared to 3.6 V in Li-ion batteries) and therefore, limited energy density. This low voltage and solubility lead to a maximum energy density of typically about 25 Wh/L for current technologies.

Other RFB systems are known, such as a bromine-polysulfide system (U.S. Pat. No. 4,485,154), zinc-bromine system (Lex, P., et al., *Power Eng. J.,* 1999, 13, 142-148), and bromine-anthraquinone aqueous RFB system (Huskinson, B., et al., *Nature,* 2014, 505, 195-198). However, these other RFB systems generally suffer from membrane crossover issues, low effective molarities, and lower than optimal cell voltages, volumetric capacities, and energy densities.

BRIEF SUMMARY OF THE DISCLOSURE

In one aspect, the instant disclosure is directed to a symmetric redox flow battery (SFRB) that utilizes the same organic redox active molecule in both the positive and negative compartments. More particularly, the redox flow battery disclosed herein includes: (i) a positive compartment containing a positive electrode in contact with a liquid electrolyte solution comprised of an organic redox active molecule dissolved in a solvent; (ii) a negative compartment containing a negative electrode in contact with a liquid electrolyte solution comprised of said (same) organic redox active molecule dissolved in a solvent; (iii) electrical communication means for establishing electrical communication between said positive electrode, said negative electrode, and an external load for directing electrical energy into or out of said symmetric redox flow battery; (iv) a separator component that separates the liquid electrolyte solution in the positive compartment from the liquid electrolyte solution in the negative compartment and substantially prevents the organic redox active molecules in positive and negative compartments from intermingling with each other, while permitting the flow of non-redox-active species between electrolyte solutions in positive and negative compartments; and (v) means capable of (i.e., having design features for) establishing flow of the electrolyte solutions past said positive and negative electrodes, respectively. In preferred embodiments, the redox flow battery described herein can advantageously be operated using high effective molarities of the redox molecules encompassed by Formula (1), and with higher cell voltages than the conventional vanadium RFB and at higher maximum energy densities and volumetric capacities.

In another aspect, the instant disclosure is directed to methods for storing and releasing electrical energy using the above-described redox flow battery. In the method, the redox flow battery is first electrically charged by supplying electrical energy to the positive and negative electrodes while the external load is not in electrical communication with the positive and negative electrodes and while flowing the liquid electrolyte solution in the positive compartment past the positive electrode and flowing the liquid electrolyte solution in the negative compartment past the negative electrode, during which the redox active molecule in the positive compartment is oxidized and the redox active molecule in the negative compartment is reduced during the charging phase. Subsequent to charging, the redox flow battery is discharged by establishing electrical communication between the external load and the positive and negative electrodes while flowing the electrolyte solutions, as above, during which the redox active molecule in the positive compartment is reduced and the redox active molecule in the negative compartment is oxidized to the original redox active material, i.e., the discharging stage employs a reversal of the redox reactions occurring in the charging stage. In addition to the advantages provided by the RFB design, as discussed above, the lack of a phase change resulting from decomposition of the redox active molecule during charging and discharging operations provides for an enhanced ease of use with uninterrupted recycling of the redox active molecule.

DETAILED DESCRIPTION OF THE DISCLOSURE

In a first aspect, the invention is directed to a symmetric redox flow battery (i.e., symmetric RFB). The term "symmetric," as used herein, refers to a design feature in the RFB in which the redox active molecule is the same in the electrolyte solutions contained in the positive and negative compartments of the RFB when the redox active molecule is in its neutral state, i.e., at rest, before the charging process or at completion of the discharging process.

The positive compartment (i.e., "cathode compartment") contains the liquid electrolyte solution (i.e., "catholyte") in contact with a positive electrode (i.e., "cathode"), wherein the term "positive electrode" does not require that the electrode be in operation to possess a positive polarity, but rather, indicates an electrode suitable in its characteristics (i.e., "when not in operation") for oxidizing the redox active molecule during the charging phase and reducing the redox active molecule during the discharging phase. The negative compartment (i.e., "anode compartment") contains the same liquid electrolyte solution (i.e., "anolyte") in contact with a negative electrode (i.e., "anode"), wherein the term "negative electrode" does not require that the electrode be in operation to possess a negative polarity, but rather, indicates an electrode suitable in its characteristics (i.e., when not in operation) for reducing the redox active molecule during the charging phase and oxidizing the redox active molecule during the discharging phase. By the same reasoning, the term "positive" and "negative," when ascribed to an electrolyte solution or compartment, is intended to indicate an electrolyte in contact with the corresponding electrode, and a compartment used for holding the corresponding electrolyte or electrode. The positive and negative compartments can be constructed of any of the materials known in the art that are non-reactive and suitable for holding aqueous or non-aqueous (i.e., organic) liquid solutions. The positive and negative electrodes are independently constructed of any of the electrode materials known in the art, particularly those used in redox flow batteries of the art and suitable for the purposes of the invention described herein. The positive and negative electrodes may independently include or be selected from, for example, graphite, carbon felt, glassy carbon, nickel on carbon, porous nickel sulfide, nickel foam, platinum, palladium, gold, titanium, titanium oxide, ruthenium oxide, iridium oxide, or a composite, such as a carbon-polyolefin composite, or a composite containing polyvinylidene difluoride (PVdF) and activated carbon, or a composite of platinum and titanium, e.g., platinized titanium. In some embodiments, the electrode material may include or be composed of an element selected from C, Si, Ga, In, Al, Ti, V, Cr, Fe, Co, Ni, Cu, Zr, Nb, Ta, Mo, W, Re, Ru, Os, Rh, Ir, Pd, Pt, Ag, Au, alloys thereof, degenerately-doped semiconductors thereof, and oxides thereof. The choice of electrode material may be dependent on the choice of redox active molecule, solvent, and other aspects of the redox flow battery in particular embodiments. For this reason, any of the specific classes or types of electrode materials described above may be excluded or specifically selected in particular embodiments.

The RFB includes a separator component that separates the electrolyte solution in the positive compartment from the electrolyte solution in the negative compartment in order to substantially prevent the organic redox molecules in the positive and negative compartments from intermingling with each other. The separator component should, however, possess a feature that permits the passage of non-redox-active species between positive and negative electrolyte solutions. The non-redox-active species are those ionic species, as well known in the art, that establish electrical neutrality and complete the circuitry in a battery, and which are included as either a supporting electrolyte or are formed during the course of the redox reactions in each compartment. In order to permit flow of non-redox-active species, the separator component may be, to some extent, porous. Some examples of inorganic or ceramic compositions for the separator component include alumina, silica (e.g., glass), titania, and zirconia. Porous organic polymers that do not separate by ionic charge but rather, size exclusion, may also be used. These can work like physical barriers directing flow geometry to prevent mixing. The separator component may operate selectively or non-selectively in its ion permeability. The separator component can have any suitable thickness and hardness. In some embodiments, the separator component is in the form of a membrane, as well known in the art.

In a particular embodiment, the separator component is an ion-selective membrane. The ion-selective membrane, also known as an ion exchange membrane (IEM), can be any the organic, inorganic (e.g., ceramic), hybrid, or composite membranes known in the art, such as those used in redox flow batteries of the art and suitable for the purposes of the invention described herein. The ion-selective membrane should substantially or completely block passage of the redox active molecule between positive and negative compartments while permitting the flow of solvent molecules and/or ion species that may evolve or be present during the electron transport process, such as hydrogen ions, halide ions, or metal ions. In some embodiments, the ion-selective membrane is a cation-selective membrane, while in other embodiments, the ion-selective membrane is an anion-selective membrane. The ion-selective membrane can include or be composed of, for example, poly(phthalazinone ether ketone) (PPEK) or sulfonated version thereof (SPPEK), poly(phthalazinone ether sulfone) (PPES) or sulfonated version thereof (SPPES), poly(phthalazinone ether sulfone ketone) (PPESK) or sulfonated version thereof (SPPESK), or an ionomer, which may be a proton conductor or proton exchange membrane, particularly a fluoropolymer (e.g., a fluoroethylene or fluoropropylene), such as a sulfonated tetrafluoroethylene-based fluoropolymer, such as Nafion®. In some embodiments, the ion-selective membrane has a hybrid structure having an organic component, such as any of the exemplary organic compositions above, in combination with an inorganic material, such as silicon ($SiO_2$). The hybrid structure can be produced by, for example, a sol gel process. The ion-selective membrane may alternatively be a composite, which includes separate layers of different membrane materials in contact with each other. The choice of membrane material may be dependent on the choice of redox active molecule, solvent, and other aspects of the redox flow battery in particular embodiments. For this reason, any of the specific classes or types of separator materials described above may be excluded or specifically selected in particular embodiments.

As the RFB operates by flowing the electrolyte solutions over the respective electrodes, the RFB includes means capable of establishing flow of the electrolyte solutions. The means may be mechanical means, such as a pump; however, other means for establishing flow are possible, including, for example, a propeller designed for use within a liquid. Typically, the RFB includes at least two flow devices, one designated for establishing flow in the positive compartment, and the other designated for establishing flow in the negative compartment. The means for establishing flow may alternatively be provided by, for example, a gravity driven pumping arrangement.

The RFB also includes electrical communication means for establishing electrical communication between the positive and negative electrodes in order to permit the RFB to be charged and discharged. In a particular embodiment, the electrical communication means include wiring means, i.e., the presence of wiring and associated bonding pads and the like sufficient for establishing electrical connection. However, the electrical communication means does not necessarily have to be in the form of wiring. For example, electrical communication may be established by assembling multiple electrodes and multiple flow channels in a stacked bipolar configuration so that electrical connections need only be made to the first and last electrodes.

The RFB should also include an external load for directing electrical energy into or out of the RFB. In one embodiment, the load has a dual function of accepting electrical energy from an electrical source during a charging phase of the RFB and also accepting electrical energy from the RFB during a discharging phase of the RFB. In another embodiment, the load functions only to accept electrical energy from the RFB during a discharging phase of the RFB, and a separate source is included for sourcing electrical energy during a charging phase of the RFB. Generally, switching means are included in order to operate the RFB in either a charging or discharging mode. For example, when operating in a charging mode, a first switch establishing connection between positive and negative electrodes and an external load is disengaged (i.e., open) while a second switch establishing connection between a source and positive and negative electrodes is engaged (i.e., closed); and in the discharging mode, the first switch establishing circuitry between positive and negative electrodes and an external load is engaged while the second switch establishing circuitry between a source and positive and negative electrodes is disengaged.

The electrolyte solutions contain the organic redox active molecule dissolved in a solvent. The solvent can be any solvent that is non-reactive with the redox active molecule and permits the redox active molecule to efficiently undergo redox reactions such that the RFB can be effectively charged and discharged. The solvent can be, for example, aqueous-based or non-aqueous (organic), protic or aprotic, and either polar or non-polar. The aqueous-based solvent can be, for example, water, or water in admixture with a water-soluble co-solvent. Some examples of protic organic solvents include the alcohols, such as methanol, ethanol, n-propanol, isopropanol, n-butanol, sec-butanol, isobutanol, t-butanol, n-pentanol, isopentanol, 3-pentanol, neopentyl alcohol, n-hexanol, 2-hexanol, 3-hexanol, 3-methyl-1-pentanol, 3,3-dimethyl-1-butanol, isohexanol, and cyclohexanol. The protic organic solvent may alternatively be or include a carboxylic acid, such as acetic acid, propionic acid, butyric acid, or a salt thereof. Some examples of polar aprotic solvents include nitrile solvents (e.g., acetonitrile, propionitrile, and butyronitrile), sulfoxide solvents (e.g., dimethyl sulfoxide, ethyl methyl sulfoxide, diethyl sulfoxide, methyl propyl sulfoxide, and ethyl propyl sulfoxide), sulfone solvents (e.g., methyl sulfone, ethyl methyl sulfone, methyl phenyl sulfone, methyl isopropyl sulfone, propyl sulfone, butyl sulfone, tetramethylene sulfone, i.e., sulfolane), amide solvents (e.g., N,N-dimethylformamide, N,N-diethylformamide, acetamide, dimethylacetamide, and N-methylpyrrolidone), ether solvents (e.g., diethyl ether, 1,2-dimethoxyethane, 1,2-diethoxyethane, 1,3-dioxolane, and tetrahydrofuran), carbonate solvents (e.g., propylene carbonate, ethylene carbonate, butylene carbonate, chloroethylene carbonate, fluorocarbonate solvents, dimethyl carbonate, diethyl carbonate, dipropyl carbonate, ethyl methyl carbonate, methyl propyl carbonate, and ethyl propyl carbonate), organochloride solvents (e.g., methylene chloride, chloroform, 1,1,-trichloroethane), ketone solvents (e.g., acetone and 2-butanone), and ester solvents (e.g., 1,4-butyrolactone, ethylacetate, methylpropionate, ethylpropionate, and the formates, such as methyl formate and ethyl formate). The polar aprotic solvent may also be or include, for example, hexamethylphosphoramide (HMPA), 1,3-dimethyl-3,4,5,6-tetrahydro-2(1H)-pyrimidinone (DMPU), or propylene glycol monomethyl ether acetate (PGMEA). Some examples of polar inorganic solvents include supercritical carbon dioxide, carbon disulfide, carbon tetrachloride, ammonia, and sulfuryl chloride fluoride. Some examples of non-polar solvents include the liquid hydrocarbons, such as the pentanes, hexanes, heptanes, octanes, pentenes, hexenes, heptenes, octenes, benzene, toluenes, and xylenes. In yet other embodiments, the solvent may be an ionic liquid, either alone or in admixture with a non-ionic liquid solvent.

The redox active molecule is dissolved in the solvent in any suitable concentration, typically a concentration of at least 0.05 molar (0.05 M). In different embodiments, depending on the redox active molecule, solvent, and other conditions, the concentration of the redox active molecule is about, at least, or above, for example, 0.05 M, 0.1 M, 0.2 M, 0.3 M, 0.4 M, 0.5 M, 0.6 M, 0.7 M, 0.8 M, 0.9 M, 1.0 M, 1.1 M, 1.2 M, 1.3 M, 1.4 M, 1.5M, 2 M, 2.5 M, 3 M, 4 M, 5 M, 6 M, 7 M, 8 M, 9 M, or 10 M, or a concentration within a range bounded by any two of the foregoing exemplary values. As used herein, the term "about" generally indicates within ±0.5%, 1%, 2%, 5%, or up to ±10% of the indicated value. For example, an amount of "about 1 M" generally indicates, in its broadest sense, 1 M±10%, which indicates 0.9-1.1 M.

The electrolyte solutions may also include one or more supporting electrolytes, which may be organic, inorganic, or a combination thereof. The supporting electrolyte is any salt compound that contains a cationic portion (e.g., alkali, alkaline earth, main group, transition metal, or ammonium species) in combination with an anionic portion (e.g., halide, phosphate, perchlorate, sulfate, carbonate, bicarbonate, nitrate, manganate, vanadate, or carboxylate species). Some examples of alkali metal salts include the lithium halides (e.g., LiF, LiCl, LiBr, LiI), sodium halides (e.g., NaF, NaCl, NaBr, NaI), potassium halides (e.g., KF, KCl, KBr, KI), rubidium halides (e.g., RbF, RbCl, RbBr, RbI), lithium phosphate, lithium hexafluorophosphate, lithium hexafluoroarsenate, lithium perchlorate, sodium perchlorate, and lithium sulfate. Some examples of alkaline earth metal salts include magnesium halides (e.g., $MgF_2$, $MgCl_2$, $MgBr_2$, $MgI_2$), calcium halides (e.g., $CaF_2$, $CaCl_2$, $CaBr_2$, $CaI_2$), strontium halides (e.g., $SrF_2$, $SrCl_2$, $SrBr_2$, $SrI_2$), barium halides (e.g., $BaF_2$, $BaCl_2$, $BaBr_2$, $BaI_2$), and magnesium sulfate. Some examples of ammonium salts include the inorganic ammonium halides (e.g., $NH_4F$, $NH_4Cl$, $NH_4Br$, $NH_4I$), organic ammonium halides (e.g., $MeNH_3Cl$, $Me_2NH_2Cl$, $Me_3NHCl$, $Me_4NCl$, $Et_4NCl$, $Bu_4NF$, $Bu_4NBr$, where Me is methyl, Et is ethyl, and Bu is n-butyl), ammonium perchlorates (e.g., tetrabutylammonium perchlorate, i.e., "TBAP"), and ammonium hydroxides. Generally, the RFB is operated such that only the organic redox active molecule, and not a supporting electrolyte, undergoes a redox reaction.

The supporting electrolyte can be included in any suitable concentration, typically at least 0.01 M. In different embodiments, the supporting electrolyte is included in the electrolyte in a concentration of about, at least, above, up to, or less than, for example, 0.01 M, 0.05 M, 0.1 M, 0.2 M, 0.3 M, 0.4 M, 0.5 M, 0.6 M, 0.7 M, 0.8 M, 0.9 M, 1.0 M, 1.1 M, 1.2 M, 1.3 M, 1.4 M, 1.5M, 2 M, 2.5 M, 3 M, 4 M, 5 M, 6 M, 7 M, 8 M, 9 M, or 10 M, or a concentration within a range bounded by any two of the foregoing exemplary values.

In one embodiment, the electrolyte solutions contained in the positive and negative compartments constitute the entire amount of electrolyte solution in the RFB, i.e., no further reserve of electrolyte solution is connected with the positive and negative compartments. In another embodiment, the positive and negative compartments are each connected by one or more conduit means (e.g., a pipe or a channel) to storage (reservoir) tanks containing additional electrolyte solution. The storage tanks can advantageously serve to replenish spent electrolyte solution and increase the electrical capacity of the RFB. The storage tanks can also advantageously serve to promote flow of the electrolyte solutions, particularly in an arrangement where the positive and negative compartments are each connected to at least two storage tanks, in which case the RFB would have at least four storage tanks. In the case of each compartment being connected to at least two storage tanks, one of the storage tanks can function as an electrolyte acceptor and the other as an electrolyte provider. The foregoing arrangement may be particularly advantageous in establishing flow of the electrolyte past the electrodes. Upon depletion of the provider tank, the roles of the tanks reverse in order to maintain flow.

The organic redox active molecule can be any organic molecule that can undergo a reversible redox reaction and remain dissolved in solution when changed in oxidation state. To do this, the redox active molecule should not decompose to form a solid or gaseous species. The term "reversible," as used herein, indicates that the organic molecule does not decompose or change phase when being oxidized or reduced under the conditions employed in the RFB. The term "organic," as used herein, refers to any molecule that possesses at least one carbon atom engaged in a covalent bond with at least one other carbon atom and/or a hydrogen atom. In some embodiments, the organic redox active molecule possesses only covalent bonds. The term "molecule," as used herein, is not meant to encompass metal complexes (i.e., metal-ligand or organometallic complexes) where the metal in the metal complex can undergo a redox reaction during operation of the RFB, but may include a metal complex if the metal does not undergo a redox reaction. The term "molecule," as used herein, may or may not also include a polymer, which is generally defined herein as a structure having at least or more than three, four, or five repeating units. Thus, in some embodiments, the organic redox active molecule may have up to or less than 3, 4, or 5 repeating units. As understood in the art, a metal complex generally includes at least one non-covalent bond, such as a coordination or dative bond, between the organic (e.g., ligand) component and the metal species. The metal species can be, for example, a transition metal species (e.g., Groups 3 to 12 of the Periodic Table), main group metal species (e.g., Groups 13 to 16 of the Periodic Table), alkali metal species (i.e., Group 1 of the Periodic Table), alkaline earth metal species (i.e., Group 2 of the Periodic Table), or lanthanide or actinide metal species, any of which may be excluded from the organic redox active molecule. In some embodiments, the organic redox active molecule is not a metal complex of any kind. In some embodiments, the organic redox active molecule can include one or more metals if only the organic component of the molecule, and not the one or more metals, undergoes a redox reaction during operation of the RFB. In some embodiments, the organic redox active molecule considered herein does not include an element other than carbon, hydrogen, halogen (e.g., fluorine, chlorine, bromine, or iodine), nitrogen, oxygen, sulfur, and phosphorus, or includes a further limited selection of such elements. In other embodiments, the organic redox active molecule does not include a metal of any kind.

In particular embodiments, the organic redox active molecule contains an aromatic ring or an acyclic unsaturated group having a π-conjugated system. The aromatic ring can be monocyclic, bicyclic, tricyclic, or a higher polycyclic ring system, and can be carbocyclic (no ring heteroatoms) or heterocyclic (one or more ring heteroatoms). Numerous such types of aromatic and heteroaromatic rings and ring systems are further described below, all of which apply herein. Some examples of aromatic or heteroaromatic organic redox molecules include those containing a benzene ring, naphthalene ring, anthracene ring, phenanthrene ring, phenalene ring, fluorene ring, azulene ring, acenaphthene ring, chrysene ring, pyrene ring, tetracene ring, triphenylene ring, benzopyrene ring, perylene ring, furan ring, thiophene ring, phenanthroline ring, pyrrole ring, imidazole ring, pyridine ring, pyrazole ring, pyrazine ring, triazine ring, and the like. Some examples of acyclic conjugated organic redox molecules include those containing a conjugated ether, enone, enedione, or ene-nitrile moiety. Any of the foregoing rings may be either unsubstituted or substituted with one or more hydrocarbon groups (R) or heteroatom-containing groups further discussed below. Some more specific examples of such organic redox molecules include redox active phenylene-vinylene molecules and oligomers, π-conjugated porphyrins, diaryl- and triaryl-amines, 2,5-bis(methylthio)thieno[3,2-b]thiophene, and N,N-diethyl-p-phenylenediamine. In some embodiments, the organic redox active molecule contains a quinone ring, or a benzoquinone ring system, or an anthraquinone ring system, wherein the quinone moiety may be a 1,4- or 1,2-quinone. The term "quinone ring," as used herein, can also (unless otherwise specified) include a "thioquinone ring," wherein a thioquinone ring may have one or both quinonyl oxygen atoms substituted with sulfur atoms. In other embodiments, the organic redox active molecule is a soluble species that shares chemical functionality with supercapacitor materials known in the art, and may be an electrochemiluminescent (ECL) molecule, such as 9,10-diphenylanthracene. Any of the foregoing rings or ring systems may or may not include one or more heteroatoms or heteroatom-containing groups, as further discussed below. Numerous such organic molecules are commercially available or can be prepared by well known synthetic procedures.

In other embodiments, the organic redox active molecule is chosen from those molecules containing functional groups that are well known in the art to facilitate stable redox reactivity. Examples of such molecules include, for example, 1,1'-dimethyl-4,4'-bipyridinium dichloride, 1,1'-dibenzyl-4,4'-bipyridinium dichloride, 2,3,5,6-tetramethyl-1,4-benzoquinone, N,N,N',N'-tetramethyl-p-phenylenediamine, bis(2-thienyl)ketone, and di-2-thienylethanedione.

In some embodiments, the RFB described herein employs an anthraquinone-containing molecule as the redox active species in the electrolyte solution. The anthraquinone-containing can be conveniently expressed by the following formula:

(1)

In Formula (1) above, $R^1$, $R^2$, $R^3$, $R^4$, $R^5$, $R^6$, $R^7$, and $R^8$ are independently selected from, for example: hydrogen atom; hydrocarbon groups R having one to twenty carbon atoms with optional inclusion of one or more heteroatoms selected from oxygen, nitrogen, sulfur, and halogen atoms (e.g., fluorine, chlorine, bromine, and/or iodine), wherein the hydrocarbon group R is attached to the shown ring by a carbon atom; halogen atoms; nitrile groups (CN); amino groups —$NR^9R^{10}$, wherein $R^9$ and $R^{10}$ are independently selected from hydrogen atom and hydrocarbon groups R; hydroxy groups; ether groups —OR; carboxamide groups —C(O)$NR^9R^{10}$ or —$NR^9$C(O)R; keto groups —C(O)R; carboxylic acid groups —C(O)OH or salt thereof; ester groups —C(O)OR; sulfonate (—S(O)$_2$OH, salt thereof, or —S(O)$_2$OR); phosphonate (—P(O)(OH)$_2$R, salt thereof, or —P(O)(OR)$_2$R); and nitrate (—$NO_2$), wherein two or more of $R^1$, $R^2$, $R^3$, $R^4$, $R^5$, $R^6$, $R^7$, and $R^8$ can optionally interconnect to form one or more additional rings on the anthraquinone ring system. Each occurrence of an oxygen atom in any of the foregoing groups may or may not be replaced with a sulfur atom to result in the corresponding thio analog, e.g., ether groups (OR) are intended to also include thioether (SR) groups, and keto groups (C(O)R) are intended to also include thioacyl groups (C(S)R), unless otherwise specified. Numerous such organic molecules are commercially available or can be prepared by well known synthetic procedures, as found, for example, in International PCT Publication WO 2014011753 and U.S. Pat. No. 3,836,547, the contents of which are herein incorporated by reference. Moreover, one or both of the quinonyl oxygen atoms shown in Formula (1) may be substituted with sulfur atoms.

In some embodiments, at least one of said $R^1$, $R^2$, $R^3$, $R^4$, $R^5$, $R^6$, $R^7$, and $R^8$ groups is an amino group of the formula —$NR^9R^{10}$. In other embodiments, at least two, three, four, five, or all of the $R^1$, $R^2$, $R^3$, $R^4$, $R^5$, $R^6$, $R^7$, $R^8$ groups are amino groups of the formula —$NR^9R^{10}$. In a first embodiment, at least one of $R^9$ and $R^{10}$ groups in the formula —$NR^9R^{10}$ is a hydrogen atom, or both of $R^9$ and $R^{10}$ groups are hydrogen atoms. In a second embodiment, at least one of $R^9$ and $R^{10}$ groups in the formula —$NR^9R^{10}$ is a hydrocarbon group R, or both of $R^9$ and $R^{10}$ groups are hydrocarbon groups R. In some embodiments, $R^9$ and $R^{10}$ are independently selected from hydrogen atom and saturated or unsaturated hydrocarbon groups (or alkyl or alkenyl groups) containing at least one or two and up to three, four, five, or six carbon atoms.

As used herein, the term "hydrocarbon group" (also denoted by the group R) is, in a first embodiment, composed solely of carbon and hydrogen. In different embodiments, one or more of the hydrocarbon groups or linkers can contain precisely, or a minimum of, or a maximum of, for example, one, two, three, four, five, six, seven, eight, nine, ten, eleven, twelve, thirteen, fourteen, fifteen, sixteen, seventeen, eighteen, nineteen, or twenty carbon atoms, or a number of carbon atoms within a particular range bounded by any two of the foregoing carbon numbers. Hydrocarbon groups or linkers in different compounds described herein, or in different positions of a compound, may possess the same or different number (or preferred range thereof) of carbon atoms in order to independently adjust or optimize the activity or other characteristics of the compound. The term "hydrocarbon linker", as used herein, is a linking group that may be derived by any of the hydrocarbon groups by including at least one additional linking point by removal of one or more hydrogen atoms from the group (e.g., a —$CH_2CH_2$— or >$CHCH_3$ linking group can be derived from an ethyl (—$CH_2CH_3$) group by removal of one of the hydrogen atoms of the ethyl group, either from an adjacent carbon atom or same carbon atom, respectively).

The hydrocarbon groups or linkers (R) can be, for example, saturated and straight-chained (i.e., straight-chained alkyl groups or alkylene linkers). Some examples of straight-chained alkyl groups (or alkylene linkers) include methyl (or methylene linker, i.e., —$CH_2$—, or methine linker), ethyl (or ethylene or dimethylene linker, i.e., —$CH_2CH_2$— linker), n-propyl, n-butyl, n-pentyl, n-hexyl, n-heptyl, n-octyl, n-nonyl, n-decyl, n-undecyl, n-dodecyl, n-tridecyl, n-tetradecyl, n-pentadecyl, n-hexadecyl, n-heptadecyl, n-octadecyl, and n-eicosyl groups (or their respective linker analogs).

The hydrocarbon groups or linkers (R) can alternatively be saturated and branched (i.e., branched alkyl groups or alkylene linkers). Some examples of branched alkyl groups include isopropyl (2-propyl), isobutyl (2-methylprop-1-yl), sec-butyl (2-butyl), t-butyl (1,1-dimethylethyl-1-yl), 2-pentyl, 3-pentyl, 2-methylbut-1-yl, isopentyl (3-methylbut-1- yl), 1,2-dimethylprop-1-yl, 1,1-dimethylprop-1-yl, neopentyl (2,2-dimethylprop-1-yl), 2-hexyl, 3-hexyl, 2-methylpent-1-yl, 3-methylpent-1-yl, isohexyl (4-methylpent-1-yl), 1,1-dimethylbut-1-yl, 1,2-dimethylbut-1-yl, 2,2-dimethylbut-1-yl, 2,3-dimethylbut-1-yl, 3,3-dimethylbut-1-yl, 1,1,2-trimethylprop-1-yl, and 1,2,2-trimethylprop-1-yl groups, isoheptyl, isooctyl, and the numerous other branched alkyl groups having up to 20 carbon atoms, wherein the "1-yl" suffix represents the point of attachment of the group. Some examples of branched alkylene linkers are those derived by removal of a hydrogen atom from one of the foregoing exemplary branched alkyl groups (e.g., isopropylene, —CH(CH$_3$)CH$_2$—).

The hydrocarbon groups or linkers (R) can alternatively be saturated and cyclic (i.e., cycloalkyl groups or cycloalkylene linkers). Some examples of cycloalkyl groups include cyclopropyl, cyclobutyl, cyclopentyl, cyclohexyl, cycloheptyl, and cyclooctyl groups. The cycloalkyl group can also be a polycyclic (e.g., bicyclic) group by either possessing a bond between two ring groups (e.g., dicyclohexyl) or a shared (i.e., fused) side (e.g., decalin and norbornane). Some examples of cycloalkylene linkers are those derived by removal of a hydrogen atom from one of the foregoing exemplary cycloalkyl groups.

The hydrocarbon groups or linkers (R) can alternatively be unsaturated and straight-chained (i.e., straight-chained olefinic or alkenyl groups or linkers). The unsaturation occurs by the presence of one or more carbon-carbon double bonds and/or one or more carbon-carbon triple bonds. Some examples of straight-chained olefinic groups include vinyl, propen-1-yl (allyl), 3-buten-1-yl (CH$_2$=CH—CH$_2$—CH$_2$—), 2-buten-1-yl (CH$_2$—CH=CH—CH$_2$—), butadienyl, 4-penten-1-yl, 3-penten-1-yl, 2-penten-1-yl, 2,4-pentadien-1-yl, 5-hexen-1-yl, 4-hexen-1-yl, 3-hexen-1-yl, 3,5-hexadien-1-yl, 1,3,5-hexatrien-1-yl, 6-hepten-1-yl, ethynyl, propargyl (2-propynyl), and the numerous other straight-chained alkenyl groups having up to 20 carbon atoms. Some examples of straight-chained olefinic linkers are those derived by removal of a hydrogen atom from one of the foregoing exemplary straight-chained olefinic groups (e.g., vinylene, —CH=CH—, or vinylidene).

The hydrocarbon groups or linkers (R) can alternatively be unsaturated and branched (i.e., branched olefinic or alkenyl groups or linkers). Some examples of branched olefinic groups include propen-2-yl (CH$_2$=C.—CH$_3$), 1-buten-2-yl (CH$_2$=C.—CH$_2$—CH$_3$), 1-buten-3-yl (CH$_2$=CH—CH.—CH$_3$), 1-propen-2-methyl-3-yl (CH$_2$=C(CH$_3$)—CH$_2$—), 1-penten-4-yl, 1-penten-3-yl, 1-penten-2-yl, 2-penten-2-yl, 2-penten-3-yl, 2-penten-4-yl, and 1,4-pentadien-3-yl, wherein the dot in any of the foregoing groups indicates a point of attachment. Some examples of branched olefinic linkers are those derived by removal of a hydrogen atom from one of the foregoing exemplary branched olefinic groups.

The hydrocarbon groups or linkers (R) can alternatively be unsaturated and cyclic (i.e., cycloalkenyl groups or cycloalkenylene linkers). The unsaturated and cyclic group can be aromatic or aliphatic. Some examples of unsaturated and cyclic hydrocarbon groups include cyclopropenyl, cyclobutenyl, cyclopentenyl, cyclopentadienyl, cyclohexenyl, cyclohexadienyl, phenyl, benzyl, cycloheptenyl, cycloheptadienyl, cyclooctenyl, cyclooctadienyl, and cyclooctatetraenyl groups. The unsaturated cyclic hydrocarbon group can also be a polycyclic group (such as a bicyclic or tricyclic polyaromatic group) by either possessing a bond between two of the ring groups (e.g., biphenyl) or a shared (i.e., fused) side, as in naphthalene, anthracene, phenanthrene, phenalene, or indene fused ring systems. Some examples of cycloalkenylene linkers are those derived by removal of a hydrogen atom from one of the foregoing exemplary cycloalkenyl groups (e.g., phenylene and biphenylene).

One or more of the hydrocarbon groups or linkers (R) may (i.e., optionally) include one or more heteroatoms, which are non-carbon non-hydrogen atoms. Some examples of heteroatoms include oxygen (O), nitrogen (N), sulfur (S), and halogen (halide) atoms. Some examples of halogen atoms include fluorine, chlorine, bromine, and iodine. In some embodiments, the heteroatom atom inserts between at least two carbon atoms (as in —C—O—C— ether, —C—S—C— thioether, —C—N(R)—C— tertiary amine, or —C=N—C— imine) or between at least one carbon atom and at least one hydrogen atom (as in —C—OH, —C—SH, —C—NH$_2$, —C—NH—C—, or —C(=NH)C—), wherein the shown carbon atom in each case can be considered part of a hydrocarbon group R described above. In other embodiments, the heteroatom replaces (i.e., substitutes) one or more hydrogen atoms and/or one or more carbon atoms in the hydrocarbon group, as in halogen-substituted groups (e.g., a —CH$_2$F, —CHF$_2$, and —CF$_3$) and carbonyl-substituted groups, such as ketone and aldehyde groups. In some embodiments, the hydrocarbon is substituted with multiple oxygen atoms to result in a dialkyleneoxide or polyalkyleneoxide group, such as a diethyleneoxide or polyethyleneoxide group. In the case of nitrogen or sulfur substitution, the nitrogen or sulfur atom may be bonded to a sufficient number of groups to make it positively charged, as in an ammonium group (e.g., —NR'$_3^+$) or sulfonium group (e.g., —SR'$_2^+$), in which case the positively charged moiety is necessarily associated with a counteranion (wherein R' independently represents hydrogen atom or any of the hydrocarbon groups described above). Likewise, a heteroatom may bear a negative charge, as in a deprotonated carboxy, thiocarboxy, sulfonate, phosphonate, hydroxy, or thiol group, in which case the negatively charged moiety is necessarily associated with a countercation.

When two or more same or different heteroatoms are bound to each other or located on the same carbon atom, the resulting group containing the heteroatoms is herein referred to as a "heteroatom-containing group". Thus, inclusion or substitution of a hydrocarbon group with one or more heteroatoms also includes heteroatom-containing groups, unless otherwise specified. Some examples of heteroatom-containing groups and linkers include carboxy (—C(O)OR' or —OC(O)R'), thiocarboxy (—C(S)OR' or —OC(S)R'), carboxamide (—C(O)NR'$_2$, —C(O)NR'—, or —N(R')C(O)—), urea (—NR'—C(O)—NR'$_2$ or —NR'—C(O)—NR'—), thiourea (—NR=C(S)—NR'$_2$ or —NR'—C(S)—NR'—), carbamate (—NR'—C(O)—OR', —OC(O)—NR'$_2$, or —NR'—C(O)—O—), thiocarbamate (—NR'—C(S)—OR', —OC(S)—NR'$_2$, or —NR'—C(S)—O—), nitro (NO$_2$), nitrile (CN), sulfonyl (—S(O)$_2$R' or —S(O)$_2$—), sulfinyl (i.e., sulfoxide, —S(O)R' or —S(O)—), disulfide (—C—S—S—C—), sulfonate (—S(O)$_2$OR'), sulfate (—OS(O)$_2$OR'), and amine oxide (as typically found in a nitrogen-containing ring), wherein R' independently represents hydrogen atom or any of the hydrocarbon groups (R) described above. For example, —C(O)OR' includes carboxylic acid (—C(O)OH) and carboxylic ester (—C(O)OR), where R is any of the hydrocarbon groups described above. The heteroatom-containing group may also either insert between carbon atoms or between a carbon atom and hydrogen atom, if applicable, or replace one or more hydrogen and/or carbon atoms.

In some embodiments, the hydrocarbon group or linker (R) is substituted with one or more halogen atoms to result in a partially halogenated or perhalogenated hydrocarbon group. Some examples of partially halogenated hydrocarbon groups include —CHY$_2$, —CH$_2$Y, —CH$_2$CY$_3$, —CH(CY$_3$)$_2$, or a halo-, dihalo-, trihalo-, or tetrahalo-substituted phenyl group, wherein Y represents any of F, Cl, Br, or I, and more commonly F or Cl. Some examples of perhalogenated hydrocarbon groups include —CY$_3$, —CY$_2$CY$_3$, —CY$_2$CY$_2$CY$_3$, —CY(CY$_3$)$_2$, or perhalophenyl, —C$_6$Y$_5$).

In some embodiments, the hydrocarbon group (R) is, or includes, a cyclic or polycyclic (i.e., bicyclic, tricyclic, or higher cyclic) saturated or unsaturated (e.g., aliphatic or aromatic) hydrocarbon group that includes at least one ring heteroatom, such as one, two, three, four, or higher number of ring heteroatoms. Such heteroatom-substitued cyclic hydrocarbon groups are referred to herein as "heterocyclic groups". As used herein, a "ring heteroatom" is an atom other than carbon and hydrogen (typically, selected from nitrogen, oxygen, and sulfur) that is inserted into or replaces a ring carbon atom in a hydrocarbon ring structure. In some embodiments, the heterocyclic group is saturated. In other embodiments, the heterocyclic group is unsaturated, i.e., aliphatic or aromatic heterocyclic groups, wherein the aromatic heterocyclic group is also referred to herein as a "heteroaromatic ring", or a "heteroaromatic fused-ring system" in the case of at least two fused rings, at least one of which contains at least one ring heteroatom. The heterocyclic group may be bound via a ring carbon atom or ring heteroatom to the remainder of the sirtuin inhibiting compound, either directly or via any of the linking groups or atoms described herein.

Some examples of saturated heterocyclic groups containing at least one oxygen atom include oxetane, tetrahydrofuran, tetrahydropyran, 1,4-dioxane, 1,3-dioxane, and 1,3-dioxepane rings. Some examples of saturated heterocyclic groups containing at least one nitrogen atom include pyrrolidine, piperidine, piperazine, imidazolidine, azepane, and decahydroquinoline rings. Some examples of saturated heterocyclic groups containing at least one sulfur atom include tetrahydrothiophene, tetrahydrothiopyran, 1,4-dithiane, 1,3-dithiane, and 1,3-dithiolane rings. Some examples of saturated heterocyclic groups containing at least one oxygen atom and at least one nitrogen atom include morpholine and oxazolidine rings. An example of a saturated heterocyclic group containing at least one oxygen atom and at least one sulfur atom includes 1,4-thioxane. An example of a saturated heterocyclic group containing at least one nitrogen atom and at least one sulfur atom includes thiazolidine and thiamorpholine rings.

Some examples of unsaturated heterocyclic groups containing at least one oxygen atom include furan, pyran, 1,4-dioxin, benzofuran, dibenzofuran, and dibenzodioxin rings. Some examples of unsaturated heterocyclic groups containing at least one nitrogen atom include pyrrole, imidazole, pyrazole, pyridine, pyrazine, pyrimidine, 1,3,5-triazine, azepine, diazepine, indole, purine, benzimidazole, indazole, 2,2'-bipyridine, quinoline, isoquinoline, phenanthroline, 1,4,5,6-tetrahydropyrimidine, 1,2,3,6-tetrahydropyridine, 1,2,3,4-tetrahydroquinoline, quinoxaline, quinazoline, pyridazine, cinnoline, 5,6,7,8-tetrahydroquinoxaline, 1,8-naphthyridine, and 4-azabenzimidazole rings. Some examples of unsaturated heterocyclic groups containing at least one sulfur atom include thiophene, thianaphthene, benzothiophene, thiochroman, and thiochromene rings. Some examples of unsaturated heterocyclic groups containing at least one oxygen atom and at least one nitrogen atom include oxazole, isoxazole, benzoxazole, benzisoxazole, oxazoline, 1,2,5-oxadiazole (furazan), and 1,3,4-oxadiazole rings. Some examples of unsaturated heterocyclic groups containing at least one nitrogen atom and at least one sulfur atom include thiazole, isothiazole, benzothiazole, benzoisothiazole, thiazoline, and 1,3,4-thiadiazole rings.

In some embodiments, any of the generic substituents (e.g., R, R$_1$, R$_2$, and the like in Formula 1) described above may independently exclude any one or more of the classes, subclasses, or particular hydrocarbon groups described above, or may independently include only specific hydrocarbon groups selected from the hydrocarbon groups (R) described above.

In a first set of embodiments, the redox active molecule according to Formula (1) contains one amino group of the formula —NR$^9$R$^{10}$, wherein R$^9$ and R$^{10}$ are independently selected from hydrogen atom and hydrocarbon groups R. The single amino group may be located at any of the eight ring positions corresponding to R$^1$, R$^2$, R$^3$, R$^4$, R$^5$, R$^6$, R$^7$, and R$^8$. The ring carbon atoms on which R$^1$, R$^2$, R$^3$, R$^5$, R$^6$, R$^7$, and R$^8$ are attached are designated as positions 1, 2, 3, 4, 5, 6, 7, and 8, respectively. Some examples of redox active molecules according to Formula (1) and containing a single amino group include 1-aminoanthraquinone, 2-aminoanthraquinone, 1-(methylamino)anthraquinone, 2-(methylamino)anthraquinone, 1-(dimethylamino)anthraquinone, 2-(dimethylamino)anthraquinone, 1-(ethylamino)anthraquinone, 2-(ethylamino)anthraquinone, 1-(diethylamino)anthraquinone, 2-(diethylamino)anthraquinone, 1-(propylamino)anthraquinone, 2-(propylamino)anthraquinone, 1-(dipropylamino)anthraquinone, 2-(dipropylamino)-anthraquinone, 1-(isopropylamino)anthraquinone, 2-(isopropylamino)anthraquinone, 1-(diisopropylamino)anthraquinone, 2-(diisopropylamino)anthraquinone, 1-(butylamino)-anthraquinone, 2-(butylamino)anthraquinone, 1-(dibutylamino)anthraquinone, 2-(dibutylamino)-anthraquinone, 1-(isobutylamino)anthraquinone, 2-(isobutylamino)anthraquinone, 1-(diisobutylamino)anthraquinone, 2-(diisobutylamino)anthraquinone, 1-(phenylamino)-anthraquinone (i.e., 1-anilinoanthraquinone), 2-anilinoanthraquinone, 1-(diphenylamino)-anthraquinone, 2-(diphenylamino)anthraquinone, 1-(p-tolyl)anthraquinone), 2-(p-tolyl)anthraquinone, 1-naphthylanthraquinone, 2-naphthylanthraquinone, 1-amino-2,4-dibromo-anthraquinone, 1-amino-2-bromo-4-hydroxy-anthraquinone, 1-amino-6-chloro-anthraquinone, 1-amino-4,5, 8-trihydroxy-anthraquinone, 1-(3-methoxy-propylamino)-anthraquinone, 1-hydroxy-4-[[3-(2-methoxyethoxy)-propyl]amino]anthraquinone, 1,4-dihydroxy-2-[[3-(2-methoxyethoxy)propyl]amino]-anthraquinone, and their sulfonic acid derivatives.

In a second set of embodiments, the redox active molecule according to Formula (I) contains two amino groups of the formula —NR$^9$R$^{10}$, wherein R$^9$ and R$^{10}$ are independently selected from hydrogen atom and hydrocarbon groups R. The two amino groups may be located at any of the eight ring positions corresponding to R$^1$, R$^2$, R$^3$, R$^4$, R$^5$, R$^6$, R$^7$, and R$^8$. Some examples of redox active molecules according to Formula (1) and containing two amino groups include 1,2-diaminoanthraquinone, 1,3-diaminoanthraquinone, 2-hydroxy-1,3-diaminoanthraquinone, 1,4-diaminoanthraquinone, 2-bromo-1,4-diaminoanthraquinone, 2-acetyl-1,4-diaminoanthraquinone, 1,5-diaminoanthraquinone, 2-hydroxy-1,7-diaminoanthraquinone, 1,8-diaminoanthraquinone, 2,3-diaminoanthraquinone, 1-hydroxy-2,3-diaminoanthraquinone, 2,6-diaminoanthraquinone, 2,7-diaminoanthraquinone, 1-hydroxy-2,7-diaminoanthraquinone, 1,2-bis(methylamino)anthraquinone, 1,4-bis(methylamino)anthraquinone, 2,3-dichloro-1,4-bis(methylamino)anthraquinone, 1,5-bis(methylamino)anthraquinone, 1,8-dihydroxy-4,5-bis(methylamino)anthraquinone, 1,8-bis(methylamino)anthraquinone, 1,2-bis(dimethylamino)anthraquinone, 1,4-bis(dimethylamino)anthraquinone, 1,5-bis(dimethylamino)anthraquinone, 1,8-bis(dimethylamino)anthraquinone, 1,4-bis(isopropylamino)anthraquinone, 1-amino-4-(isopropylamino)anthraquinone, 1,4-dianilinoanthraquinone, 1,8-dianilinoanthraquinone, 1,4-bis-(p-tolylamino)anthraquinone, 1,8-bis-(p-tolylamino)anthraquinone, 1,4-diamino-2,3-dibromo-anthraquinone, 1-amino-2-bromo-4-((3-(dimethylamino)propyl)amino)anthraquinone, 1-[[3-(dimethylamino)propyl]amino]-4-[(4-methylphenyl)amino]anthraquinone, 1,4-bis-((3-(dimethylamino)propyl)amino)anthraquinone, 1-amino-4[4-(dimethylaminomethyl)anilino]anthraquinone, 1-amino-4-(phenylamino)anthraquinone, and 1-amino-4,8-dihydroxy-5-(phenylamino)anthraquinone.

In a third set of embodiments, the redox active molecule according to Formula (I) contains three amino groups of the formula —NR$^9$R$^{10}$, wherein R$^9$ and R$^{10}$ are independently selected from hydrogen atom and hydrocarbon groups R. The three amino groups may be located at any of the eight ring positions corresponding to R$^1$, R$^2$, R$^3$, R$^4$, R$^5$, R$^6$, R$^7$, and R$^8$. Some examples of redox active molecules according to Formula (1) and containing three amino groups include 1,2,3-triaminoanthraquinone, 1,4,5-triaminoanthraquinone, 2-hydroxy-1,4,5-triaminoanthraquinone, 2-bromo-1,4,5-triaminoanthraquinone, 2,3-dibromo-1,4,5-triamino-anthraquinone, and 1,4-diamino-8-((3-(dimethylamino)propyl)amino)anthraquinone.

In a fourth set of embodiments, the redox active molecule according to Formula (1) contains four amino groups of the formula —NR$^9$R$^{10}$, wherein R$^9$ and R$^{10}$ are independently selected from hydrogen atom and hydrocarbon groups R. The four amino groups may be located at any of the eight ring positions corresponding to R$^1$, R$^2$, R$^3$, R$^4$, R$^5$, R$^6$, R$^7$, and R$^8$. Some examples of redox active molecules according to Formula (1) and containing four amino groups include 1,4,5,8-tetraaminoanthraquinone, 1,4,5,8-tetrakis(methylamino)anthraquinone, 1,4,5,8-tetrakis(dimethylamino)anthraquinone, 1,4,5,8-tetrakis(isopropylamino)anthraquinone, 1,4,5,8-tetrakis(diisopropylamino)anthraquinone, 1,4,5,8-tetraanilinoanthraquinone, 1,4,5,8-tetrakis(p-tolylamino)anthraquinone, 1,4,5,8-tetrakis[(3-methylphenyl)amino]anthraquinone, and 1,4,5,8-tetrakis(cyclohexylamino)anthraquinone.

A large proportion of the anthraquinone redox molecules described above can be obtained commercially. Many of the anthraquinone molecules are used as dyestuffs. Otherwise, the anthraquinone redox molecule can be prepared by means well known in the art, such as described in Y. Baqi et al., *Nature Protocols,* 5, - 945 - 953 (2010); S. M. M. Nor et al., Molecules, 18, pp. 8046-8062 (2013); H. Naeimi et al., Dyes and Pigments, vol. 81, no. 3, June 2009, pp. 259-263; B. R. Madje et al., Green Chemistry Letters and Reviews, vol. 3, no. 4, December 2010, pp. 269-273; M. A. Gouda et al., *Turk. J. Chem.,* 34, pp. 651-709 (2010); and U.S. Pat. No. 3,249,626, the contents of which are herein incorporated by reference.

In another aspect, the invention is directed to a method for storing and releasing electrical energy by use of the above-described redox flow battery. In the method, the RFB is first charged by supplying electrical energy to the positive and negative electrodes while the external load is not in electrical communication with the positive and negative electrodes and while flowing the electrolyte solutions, during which the redox active molecule in the positive compartment is oxidized and the redox active molecule in the negative compartment is reduced. As such, inputted electrical energy has been converted and stored as electrochemical energy. The electrochemical energy is stored in the energetically uphill half reactions occurring in the positive and negative compartments during the charging process. The resulting electrochemical potential energy is stored until a discharging process occurs, during which the stored electrochemical energy is converted to electrical energy while flowing the electrolyte solutions, with concomitant reversal of the two half reactions (i.e., reduction in the positive compartment and oxidation in the negative compartment) to form the initial lower energy redox molecules present in both compartments before the charging process. Each half reaction generally operates by one or more one-electron processess, but they may also operate by multi-electron processes (e.g., one or more two-, three-, or four-electron processes), depending on the redox active molecule. The source of electrical energy in the charging process can be any desired source of electrical energy. In particular embodiments, the source of electrical energy is a renewable source of energy, such as wind, solar, or hydropower. In embodiments where the redox active molecule exhibits a color change upon oxidation or reduction, the color change can be relied upon as an observation tool for readily determining the state of charge of the redox flow battery. In order to permit such visual referencing, the positive and negative compartment should include means for visually observing the electrolyte solutions. The means for visually observing the electrolyte can be, for example, use of a translucent or transparent material for the compartment material, or incorporation of a window in the wall of an opaque electrolyte compartment, or reliance on a visible spectroscopic device that indicates the state of the battery by measurement of the wavelength and intensity of the electrolyte.

Examples have been set forth below for the purpose of illustration and to describe the best mode of the invention at the present time. However, the scope of this invention is not to be in any way limited by the examples set forth herein.

EXAMPLES

Figure 1:
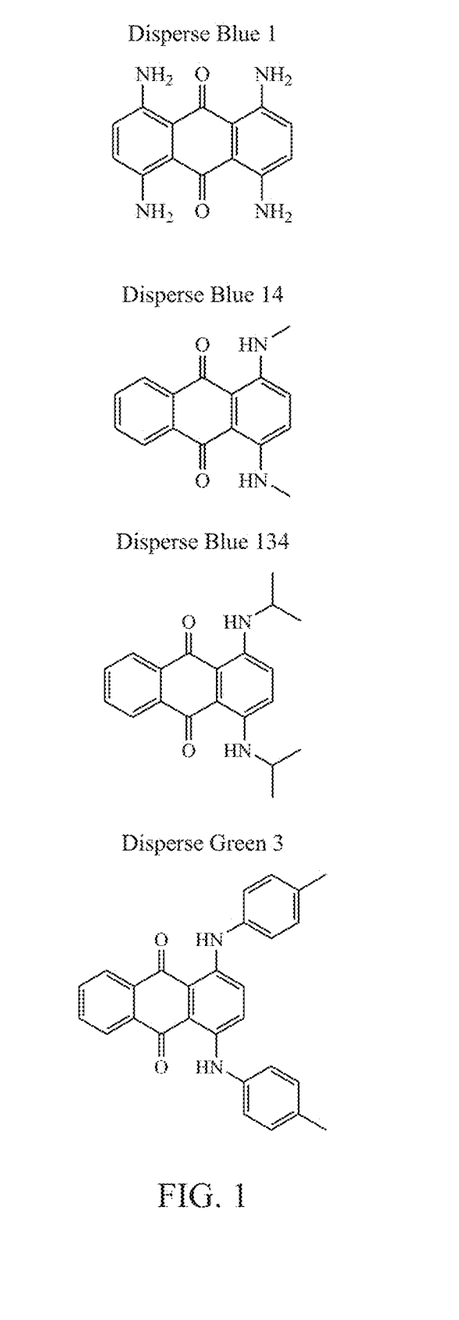
FIG. 1. Four exemplary diaminoanthraquinone (DAAQ) compounds considered as redox active molecules in a symmetric redox flow battery.
Figure 2:
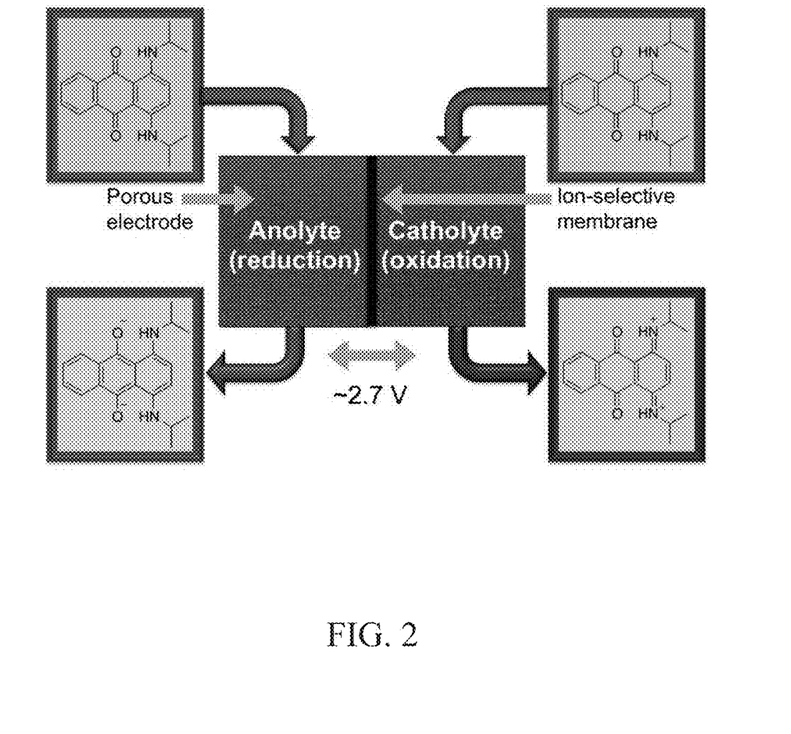
FIG. 2. General schematic of the redox reactions occurring in an exemplary redox flow battery of the invention. The same initial electrolyte solution is used in both the positive and negative compartments.

Characterization of Exemplary Diaminoanthraquinone (DAAQ) Redox Active Compounds In this experiment, four DAAQ redox active compounds were analyzed. The structures of the four DAAQ compounds are shown in FIG. 1. FIG. 2 provides a general schematic of the redox reactions occurring in an exemplary redox flow battery of the invention. The same initial electrolyte solution is used in both the positive and negative compartments. This is flowed past current collectors (either conductive plates patterned with micromixers or a porous conductive material). An ion-selective membrane separates the two streams, thereby preventing power loss through recombination. The battery is fully charged to the dication and dianion by two consecutive one-electron reductions at the negative electrode and two consecutive one-electron oxidations at the positive electrode. Upon discharge, the flow of the solutions is reversed as they return to the neutral form, supplying electrical energy to a load.

Figure 3A:
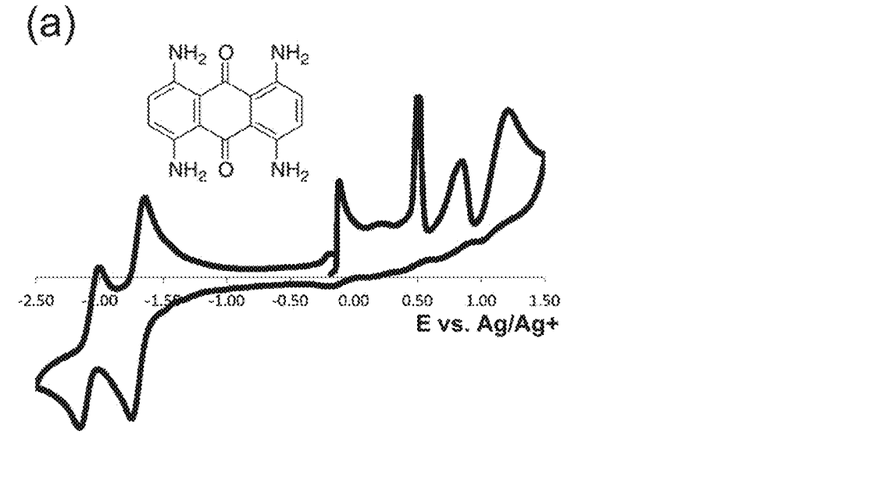
FIGS. 3A, 3B, 3C, 3D. Graphs showing four separate cyclic voltammagrams, one for each of the four exemplary DAAQ compounds depicted in FIG. 1 ranging in concentration from 5 mM to 10 mM. Data were collected using a glassy carbon working electrode, a platinum counter electrode, and a Ag/Ag$^+$ reference electrode in acetonitrile solvent with 0.1 M TBAP supporting electrolyte.
Figure 3B:
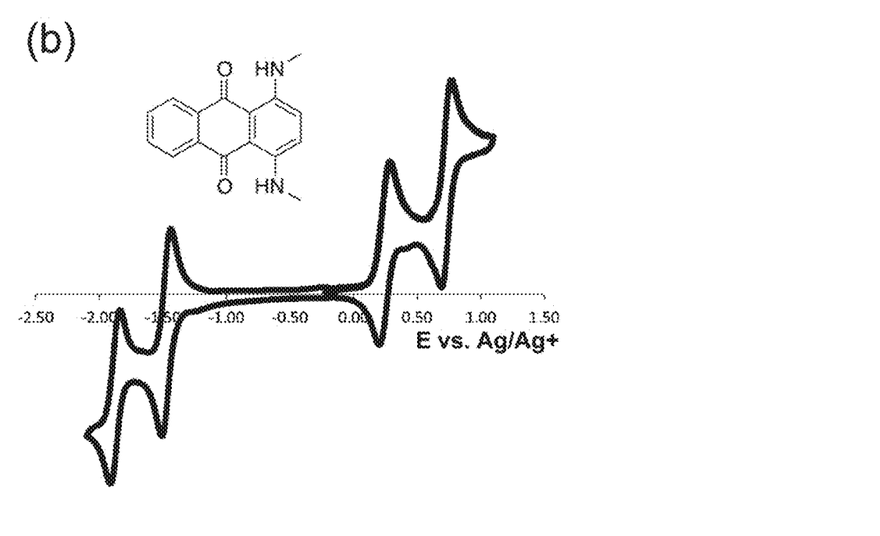
Figure 3C:
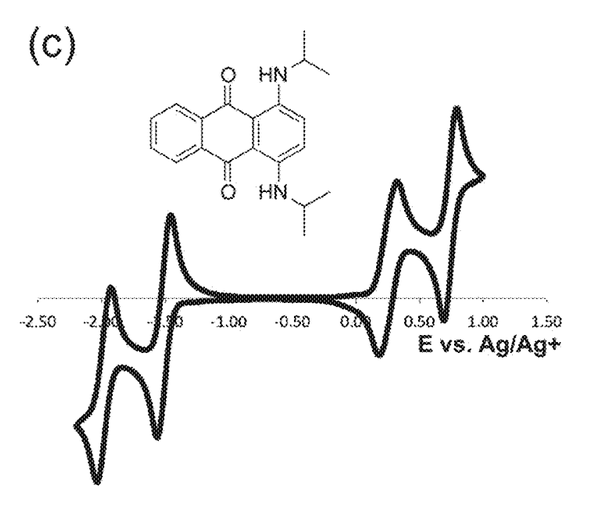
Figure 3D:
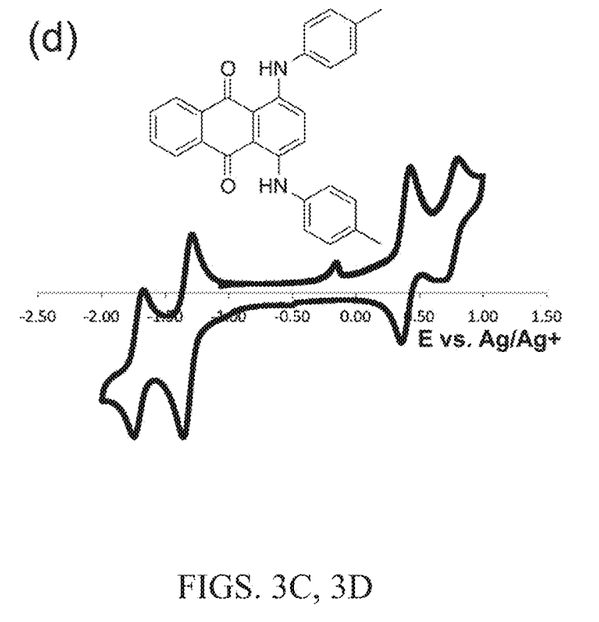

FIGS. 3A, 3B, 3C and 3D are graphs showing cyclic voltammagrams for the four exemplary DAAQ compounds depicted in FIG. 1. Data were collected using a glassy carbon working electrode, a platinum counter electrode, and a Ag/Ag+ reference electrode in acetonitrile solvent with 0.1 M TBAP supporting electrolyte. The species whose electrochemical behavior is shown in FIG. 3C, in particular, is 1,4-bis(isopropylamino)anthraquinone, which is available commercially as disperse-blue 134(DB-134). It is easily synthesized from anthraquinone, which is in turn synthesized by oxidation of anthracene, a byproduct of oil refining. DB-134 goes through two highly reversible redox reactions at 0.25 V and 0.75 V vs. Ag/Ag+, which corresponds to oxidation of the amines. It also goes through two highly reversible redox reactions at −1.50 V and −2.00 V vs. Ag/Ag+, corresponding to reductions of the quinone groups.

Figures 4A, 4B:
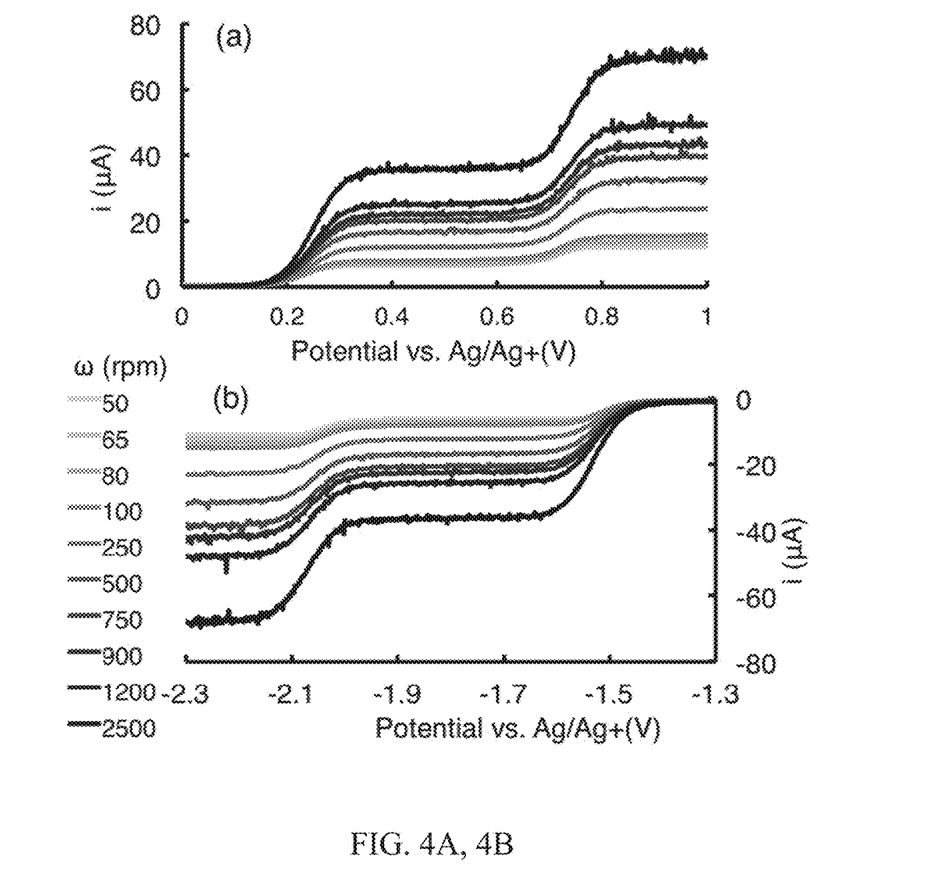
FIGS. 4A, 4B. Graph showing rotating-disk electrode voltammetry anodic (FIG. 4A) and cathodic (FIG. 4B) sweeps under the same electrolyte conditions used in FIG. 3C.

The kinetic properties of the redox reactions of DB-134 were examined using rotating-disk voltammetry, the results of which are shown in FIGS. 4A and 4B. The kinetics of both oxidation and reduction of this compound are extremely fast and reversible, attesting to its high utility a RFB electrolyte. The potential difference (ΔE) between the first oxidation and reduction of DB-134 is 1.75 V, and ΔE is 2.75 V between the second oxidation and reduction. Therefore, the theoretical average battery voltage for this symmetric electrolyte is 2.25 V. This implies a specific energy density of 375 Whr/kg for the pure compound. As a dissolved redox flow electrolyte, the theoretical volumetric energy density of a 1 M solution would be ~120 Whr/L, or 60 Whr/L for a full symmetric RFB system. This energy density greatly exceeds that of existing vanadium electrolytes (~30 Whr/L at 2 M electrolyte concentration) due to a combination of high cell voltage and multiple electron transfers per formula unit.

Figure 5:
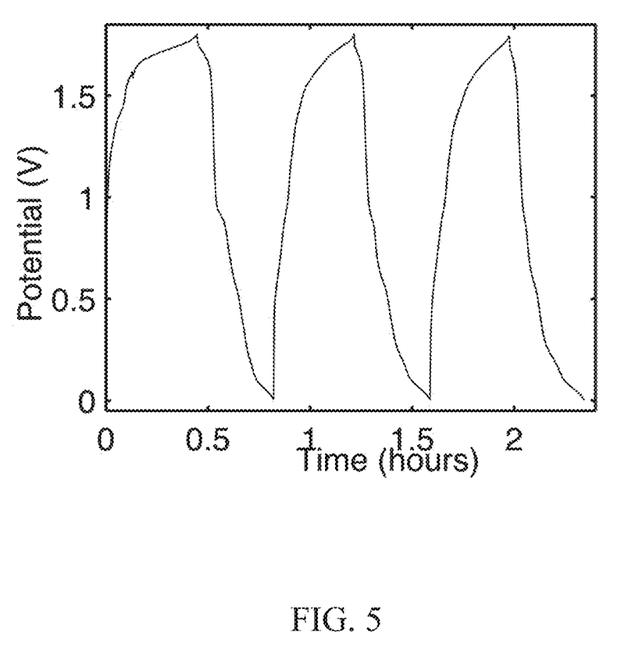
FIG. 5. Graph showing two-electrode series of three charge-discharge cycles of a rigorously stirred 0.2 mM solution of DB-134 in acetonitrile with 0.2 M TBAP. Data were collected using two vitreous carbon electrodes in a glass H-cell.

FIG. 5 is a graph of the charge-discharge behavior of a galvanic cell based on DB-134. FIG. 5 shows the results of a series of three galvanostatic charge-discharge cycles of a 0.2 mM solution of DB-134 in acetonitrile using a simple, two-compartment glass cell separated by a medium porosity frit. The redox transitions were accompanied by distinct color changes in the highly absorbing electrolytes that could, in principle, be used as colorimetric indicators of the state of charge of the cell.

While there have been shown and described what are at present considered the preferred embodiments of the invention, those skilled in the art may make various changes and modifications which remain within the scope of the invention defined by the appended claims.

What is claimed is:

1. A symmetric redox flow battery comprising:
    a positive compartment containing a positive electrode in contact with a liquid electrolyte solution comprised of an organic redox active molecule dissolved in a solvent;
    a negative compartment containing a negative electrode in contact with a liquid electrolyte solution comprised of said organic redox active molecule dissolved in a solvent;
    electrical communication means for establishing electrical communication between said positive electrode, said negative electrode, and an external load for directing electrical energy into or out of said symmetric redox flow battery;
    a separator component that separates the liquid electrolyte solution in the positive compartment from the liquid electrolyte solution in the negative compartment and substantially prevents the organic redox active molecules in positive and negative compartments from intermingling with each other, while permitting the passage of non-redox-active species between electrolyte solutions in positive and negative compartments; and
    means capable of establishing flow of the electrolyte solutions past said positive and negative electrodes, respectively.

2. The redox flow battery of claim 1, wherein the organic redox active molecule contains an aromatic ring.

3. The redox flow battery of claim 1, wherein the organic redox active molecule contains a quinone ring.

4. The redox flow battery of claim 3, wherein the organic redox active molecule is an anthraquinone-containing molecule.

5. The redox flow battery of claim 4, wherein the anthraquinone-containing molecule has a structure according to the following formula:

wherein $R^1$, $R^2$, $R^3$, $R^4$, $R^5$, $R^6$, $R^7$, and $R^8$ are independently selected from: hydrogen atom; hydrocarbon groups R having one to twenty carbon atoms with optional inclusion of one or more heteroatoms selected from oxygen, nitrogen, sulfur, and halogen atoms, wherein said hydrocarbon group R is attached to the shown ring by a carbon atom; halogen atoms; nitrile groups; amino groups —$NR^9R^{10}$, wherein $R^9$ and $R^{10}$ are independently selected from hydrogen atom and hydrocarbon groups R; hydroxy groups; ether groups —OR; carboxamide groups —$C(O)NR^9R^{10}$ or —$NR^9C(O)R$; keto groups —C(O)R; carboxylic acid groups —C(O)OH or salt thereof; ester groups —C(O)OR; sulfonate groups; phosphonate groups; and nitrate groups, wherein two or more of $R^1$, $R^2$, $R^3$, $R^4$, $R^5$, $R^6$, $R^7$, and $R^8$ can optionally interconnect to form one or more additional rings on the anthraquinone ring system.

6. The redox flow battery of claim 5, wherein at least one of said $R^1$, $R^2$, $R^3$, $R^4$, $R^5$, $R^6$, $R^7$, and $R^8$ groups is an amino group of the formula —$NR^9R^{10}$.

7. The redox flow battery of claim 5, wherein at least two of said $R^1$, $R^2$, $R^3$, $R^4$, $R^5$, $R^6$, $R^7$, and $R^8$ groups are amino groups of the formula —$NR^9R^{10}$.

8. The redox flow battery of claim 5, wherein at least three of said $R^1$, $R^2$, $R^3$, $R^4$, $R^5$, $R^6$, $R^7$, and $R^8$ groups are amino groups of the formula —$NR^9R^{10}$.

9. The redox flow battery of claim 5, wherein at least four of said $R^1$, $R^2$, $R^3$, $R^4$, $R^5$, $R^6$, $R^7$, and $R^8$ groups are amino groups of the formula —$NR^9R^{10}$.

10. The redox flow battery of claim 1, further comprising one or more electrolyte storage tanks with conduit means connected to said positive and negative compartments.

11. The redox flow battery of claim 1, wherein said liquid electrolyte solution further comprises a supporting electrolyte.

12. The redox flow battery of claim 1, wherein said solvent is aqueous-based.

13. The redox flow battery of claim 1, wherein said solvent is an organic solvent.

14. The redox flow battery of claim 1, further comprising an electrical source for intermittent supply of electrical energy to the symmetric redox flow battery for charging of the symmetric redox flow battery, and said load is designed and electrically connected in a manner that stores electrical energy produced from said symmetric redox flow battery.

15. The redox flow battery of claim 14, further comprising switching means in electrical communication with said source and load for regulating when said source and load are in electrical communication with said positive and negative electrodes.

16. A method for storing and releasing electrical energy, the method comprising electrically charging a symmetric redox flow battery followed by electrically discharging said symmetric redox flow battery, wherein said symmetric redox flow battery comprises:
   a positive compartment containing a positive electrode in contact with a liquid electrolyte solution comprised of an organic redox active molecule dissolved in a solvent;
   a negative compartment containing a negative electrode in contact with a liquid electrolyte solution comprised of said organic redox active molecule dissolved in a solvent;
   electrical communication means for establishing electrical communication between said positive electrode, said negative electrode, and an external load for directing electrical energy into or out of said symmetric redox flow battery;
   a separator component that separates the liquid electrolyte solution in the positive compartment from the liquid electrolyte solution in the negative compartment and substantially prevents the redox active molecules in positive and negative compartments from intermingling with each other, while permitting the passage of non-redox-active species between electrolyte solutions in positive and negative compartments; and
   means that establish flow of the electrolyte solutions past said positive and negative electrodes, respectively;
   charging said redox flow battery by supplying electrical energy to said positive and negative electrodes while said external load is not in electrical communication with said positive and negative electrodes and while flowing the electrolyte solutions, to result in oxidation of the organic redox active molecule in the liquid electrolyte in the positive compartment and reduction of the organic redox active molecule in the liquid electrolyte in the negative compartment, to produce, respectively, an oxidized version of the organic redox active molecule in the positive compartment and a reduced version of the organic redox active molecule in the negative compartment; and
   discharging said redox flow battery by establishing electrical communication between said external load with said positive and negative electrodes and while flowing the electrolyte solutions, to result in net electrical power output dissipated at the external load with concomitant reversal of redox reactions of the organic redox active molecule in the positive and negative compartments.

17. The method of claim 16, wherein the organic redox active molecule contains an aromatic ring.

18. The method of claim 16, wherein the organic redox active molecule contains a quinone ring.

19. The method of claim 18, wherein the organic redox active molecule is an anthraquinone-containing molecule.

20. The method of claim 19, wherein the anthraquinone-containing molecule has a structure according to the following formula:

wherein $R^1$, $R^2$, $R^3$, $R^4$, $R^5$, $R^6$, $R^7$, and $R^8$ are independently selected from: hydrogen atom; hydrocarbon groups R having one to twenty carbon atoms with optional inclusion of one or more heteroatoms selected from oxygen, nitrogen, sulfur, and halogen atoms, wherein said hydrocarbon group R is attached to the shown ring by a carbon atom; halogen atoms; nitrile groups; amino groups —$NR^9R^{10}$, wherein $R^9$ and $R^{10}$ are independently selected from hydrogen atom and hydrocarbon groups R; hydroxy groups; ether groups —OR; carboxamide groups —C(O)$NR^9R^{10}$ or —$NR^9$C(O)R; keto groups —C(O)R; carboxylic acid groups —C(O)OH or salt thereof; ester groups —C(O)OR; sulfonate groups; phosphonate groups; and nitrate groups, wherein two or more of $R^1$, $R^2$, $R^3$, $R^4$, $R^5$, $R^6$, $R^7$, and $R^8$ can optionally interconnect to form one or more additional rings on the anthraquinone ring system.

21. The method of claim 20, wherein at least one of said $R^1$, $R^2$, $R^3$, $R^4$, $R^5$, $R^6$, $R^7$, and $R^8$ groups is an amino group of the formula —$NR^9R^{10}$.

22. The method of claim 20, wherein at least two of said $R^1$, $R^2$, $R^3$, $R^4$, $R^5$, $R^6$, $R^7$, and $R^8$ groups are amino groups of the formula —$NR^9R^{10}$.

23. The method of claim 20, wherein at least three of said $R^1$, $R^2$, $R^3$, $R^4$, $R^5$, $R^6$, $R^7$, and $R^8$ groups are amino groups of the formula —$NR^9R^{10}$.

24. The method of claim 20, wherein at least four of said $R^1$, $R^2$, $R^3$, $R^4$, $R^5$, $R^6$, $R^7$, and $R^8$ groups are amino groups of the formula —$NR^9R^{10}$.

25. The method of claim 16, wherein said electrical charging is provided by a renewable source of energy.

26. The method of claim 16, wherein the flow in said liquid electrolyte solution is established by a pump connected to a motor that is electrically interconnected with said load.

27. The method of claim 26, wherein said motor derives electrical energy from the symmetric redox flow battery during a discharge phase.

28. The method of claim 16, further comprising one or more electrolyte storage tanks with conduit means connected to said positive and negative compartments.

29. The method of claim 16, wherein said liquid electrolyte solution further comprises a supporting electrolyte.

30. The method of claim 16, wherein said solvent is aqueous-based.

31. The method of claim 16, wherein said solvent is an organic solvent.

32. The method of claim 16, further comprising an electrical source for intermittent supply of electrical energy to the symmetric redox flow battery for charging of the symmetric redox flow battery, and said load is designed and electrically connected in a manner that stores electrical energy produced from said symmetric redox flow battery.

33. The method of claim 16, further comprising switching means in electrical communication with said source and load for regulating when said source and load are in electrical communication with said positive and negative electrodes.

34. The method of claim 16, wherein the organic redox active molecule has a characteristic of exhibiting a visible change in color when changing its oxidation state, and said change in color is relied upon for determining the state of charge of the redox flow battery, provided that said positive and negative compartments include means for visually observing the electrolyte solutions.

* * * * *